(12) United States Patent
Rogers

(10) Patent No.: US 6,357,482 B1
(45) Date of Patent: Mar. 19, 2002

(54) SURGE SUPPRESSION APPARATUS

(75) Inventor: John Anthony Rogers, Dorset (GB)

(73) Assignee: Binks Limited, West Midland (GB)

( * ) Notice: Subject to any disclaimer, the term of this patent is extended or adjusted under 35 U.S.C. 154(b) by 0 days.

(21) Appl. No.: 09/587,274

(22) Filed: Jun. 5, 2000

(30) Foreign Application Priority Data

Jun. 4, 1999 (GB) .............................................. 9912916

(51) Int. Cl.⁷ ................................................ F16L 55/04
(52) U.S. Cl. ......................................... 138/30; 138/27
(58) Field of Search ..................................... 138/27, 30

(56) References Cited

U.S. PATENT DOCUMENTS

| | | | |
|---|---|---|---|
| 1,974,323 A | * | 9/1934 | Allen ........................... 138/30 |
| 3,182,685 A | * | 5/1965 | Mercier ....................... 138/30 |
| 3,447,557 A | | 6/1969 | Phelps |
| 4,335,751 A | * | 6/1982 | Sugimura et al. .............. 138/30 |
| 4,408,635 A | * | 10/1983 | Packer ......................... 138/30 |
| 5,028,038 A | * | 7/1991 | De Fontenay ............... 138/30 |
| 5,904,181 A | * | 5/1999 | Tooma et al. ................. 138/30 |
| 6,019,135 A | * | 2/2000 | Onishi ......................... 138/30 |

FOREIGN PATENT DOCUMENTS

| DE | 1 940 244 | 2/1971 |
|---|---|---|
| GB | 751895 | 7/1956 |

* cited by examiner

Primary Examiner—James Hook
(74) Attorney, Agent, or Firm—Lowe Hauptman Gilman & Berner, LLP

(57) ABSTRACT

A surge suppression apparatus (1) comprising a chamber (7) for receiving a liquid subject to pressure variation effects that are to be suppressed and an inlet (9) through which liquid is suppliable to the chamber (7), the arrangement being such that, in use, inlet flow exiting the inlet (9) is directed towards a wall (7c) of the chamber (7) at an oblique angle to that wall.

10 Claims, 2 Drawing Sheets

SURGE SUPPRESSION APPARATUS

BACKGROUND OF THE INVENTION

This invention relates to a surge suppression apparatus. More particularly, the invention relates to apparatus for suppressing the effects of pressure variations in a liquid, for example paint, supplied under pressure along a supply line.

SUMMARY OF THE INVENTION

The invention provides a surge suppression apparatus comprising a chamber for receiving a liquid subject to pressure variation effects that are to be suppressed and an inlet through which liquid is suppliable to the chamber, the arrangement being such that, in use, inlet flow exiting the inlet is directed towards a wall of the chamber at an oblique angle to that wall.

The above-mentioned arrangement facilitates the promotion of swirl currents in the liquid throughout the chamber, for effectively flushing the chamber for cleaning, and is particularly advantageous, for example, where the apparatus is used in a paint supply line, where it is important that a previously supplied colour of paint is entirely removed from the apparatus by flushing.

Conveniently, at least a portion of the chamber wall towards which the inlet flow is directed is curved.

Preferably, the chamber wall is configured to promote movement of the liquid in the chamber in a swirl flow over substantially the entire area of the wall.

The chamber may be a sub-chamber defined by said chamber wall and a surface of a diaphragm.

Preferably, the chamber wall is configured to promote movement of the liquid in the chamber in a swirl flow over substantially the entire area of the wall and the surface of the diaphragm.

The chamber wall may be dished, the inlet being spaced from a central axis of the dish.

Conveniently, the chamber further comprises an outlet arranged concentrically with the axis. Such an arrangement can facilitate the promotion of vortical outlet flow, further contributing to swirl flow in the chamber.

In order that the invention may be better understood, an embodiment thereof will now be described, by way of example only, with reference to the accompanying drawings, wherein:

DETAILED DESCRIPTION OF THE DRAWINGS

Figure 1:
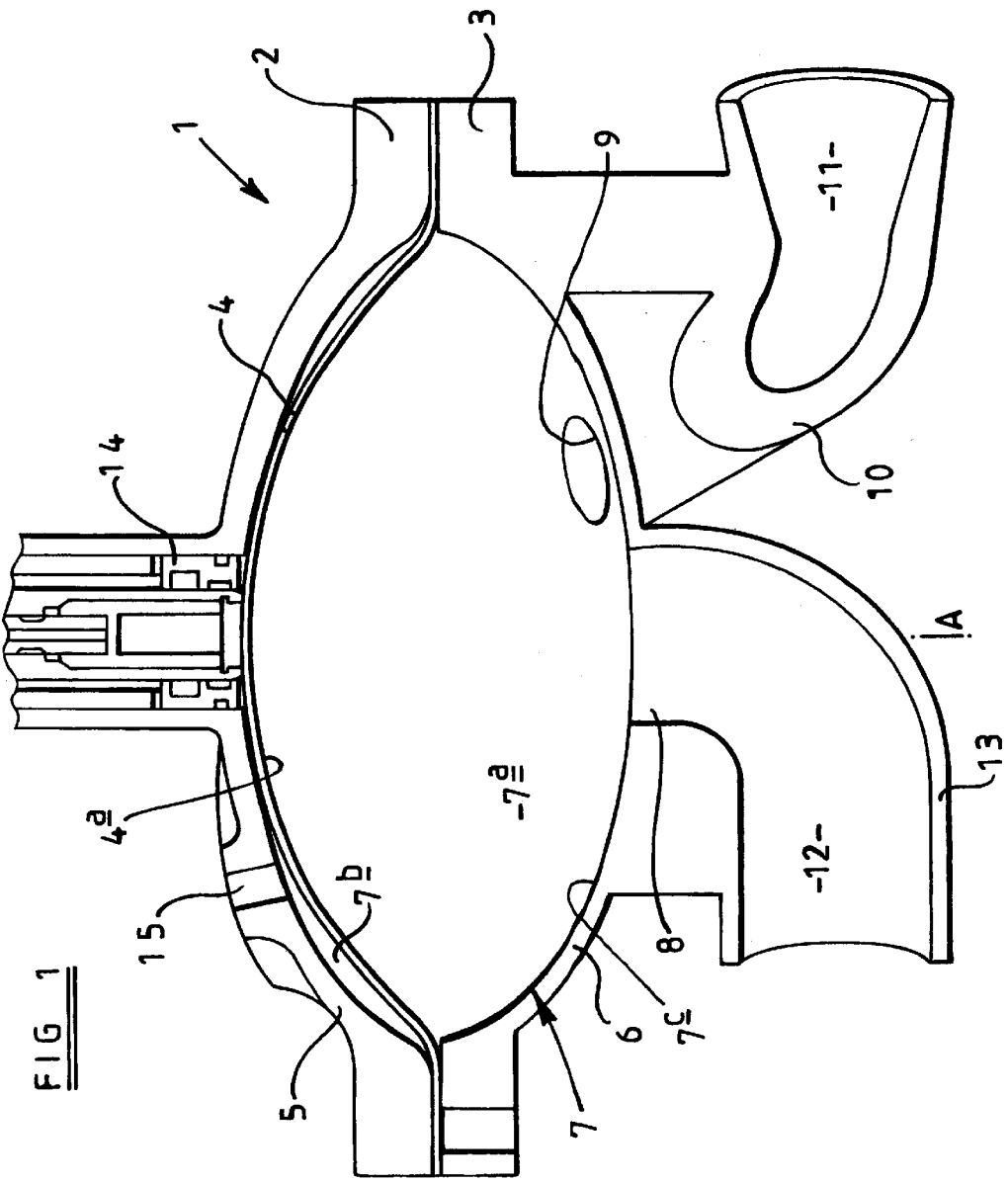
FIG. 1 is a sectional side view of a surge suppresser.

The surge suppresser 1 shown in the Figures comprises first and second housing components 2,3 and a flexible circular diaphragm 4. Each housing component has a dished portion 5,6, which is shown as generally part spherical in the Figures. The housing components 2,3 are fitted together such that the generally part-spherical portions 5,6 define a chamber 7. The diaphragm 4 is trapped at its periphery between the housing components 2,3 so as to form a seal where it interfaces with the housing components 2,3 and divide the chamber 7 into first and second sub-chambers 7a, 7b.

Figure 2:
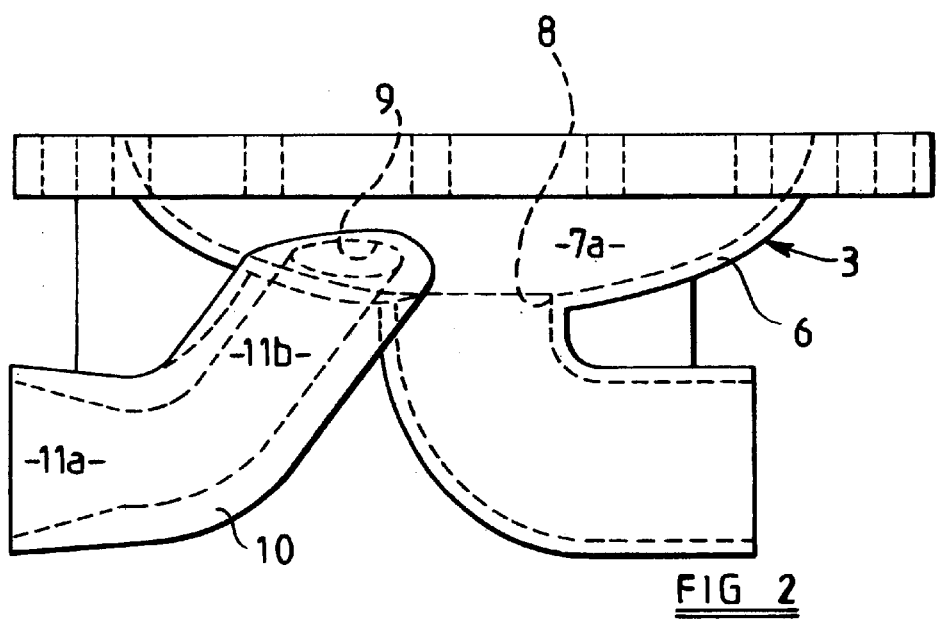
FIG. 2 is a side view of a housing component of the suppresser shown in FIG. 1, hidden features being shown by broken lines.

One of the housing components 3 (the lower component in the orientation seen in FIGS. 1 and 2) defines an outlet orifice 8, disposed concentrically with respect to an axis A—A of the suppresser, and an inlet orifice 9 spaced from the axis A—A. The lower housing component 3 includes an inlet pipe 10 defining an inlet passageway 11 through which liquid is suppliable to the inlet orifice 9 and one of the sub-chambers 7a (the lower sub-chamber in the orientation shown in FIGS. 1 and 2). The inlet passageway 11 has a funnel-shaped portion 11a arranged to accelerate liquid flowing therethrough in a direction transversely of the axis A—A (generally horizontally in the orientation shown in FIGS. 1 and 2). The funnel-shaped portion 11a communicates with a restricted diameter portion 11b of the inlet passageway 11 that is arranged to direct liquid obliquely of the axis A—A and upwardly (as shown in FIGS. 1 and 2) to the inlet orifice 9. Such acceleration of the liquid contributes to an improved scouring action that is particularly useful for cleaning the sub-chamber 7a. Liquid can exit the sub-chamber 7a through the outlet orifice 8, which is defined by an outlet pipe 13 having an outlet passageway 12.

The sub-chamber 7b (the upper sub-chamber in the orientation shown in FIGS. 1 and 2) contains a gas under pressure. Pressure regulation means indicated generally as 14,15 is provided for regulating gas flow into and out of the upper sub-chamber 7b and detecting the position along the axis A—A of the centre of the diaphragm. The diaphragm 4 is shown fully distended in FIG. 1, but in normal operation is arranged to extend generally perpendicularly of the axis A—A, dividing the chamber 7 into two volumes 7a,7b.

In use, the surge suppresser 1 is connected in series with a liquid supply line (not shown) by means of the inlet and outlet pipes 10,13. The supply line may supply paint under pressure from a paint source to a plurality of paint spray guns, for example, and the supply line may be pressurised by one or more pumps. The liquid enters the sub-chamber 7a defined by a sub-chamber wall 7c and a surface 4a (the lower surface in the orientation shown in FIG. 1) of the diaphragm 4. Pressure variations in the supply of liquid upstream of the sub-chamber 7a are absorbed by flexure of the diaphragm 4 accompanied by expansion or compression of the pressurised gas above the diaphragm 4 to substantially eliminate the effects of those pressure variations downstream of the sub-chamber 7a.

Figure 3:
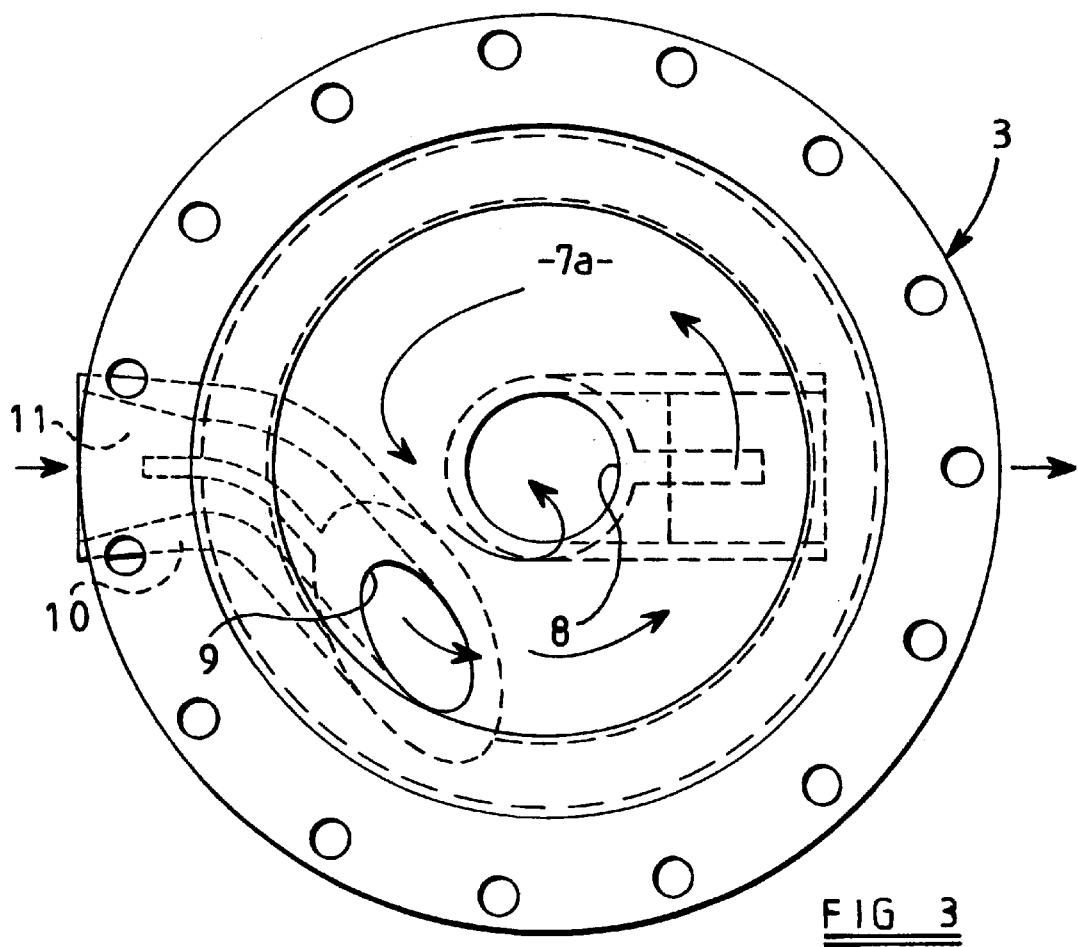
FIG. 3 is a plan view of the component shown in FIG. 2.

Liquid exiting the inlet orifice 9 is directed obliquely towards the wall 7c of the sub-chamber 7a and upwardly (in the orientation shown in the Figures) away from the inlet orifice 9. The curve in the wall 7c of the sub-chamber 7a promotes movement of the inlet flow in a constant swirling motion shown generally by the arrows in FIG. 3. Also, the location and shape of the outlet orifice 8 causes liquid exiting the outlet orifice 8 to tend to form a vortex, further promoting swirl flow. The resulting constant laminar flow of the liquid across the entire sub-chamber wall 7c and diaphragm surface 4a tends to prevent settlement of particles, for example pigments, in the liquid and makes subsequent cleaning more effective. Such flow mitigates against the creation of areas of low or zero liquid velocity in the subchamber 7c.

When it is desired to change the nature of liquid flowing in the supply line, for example to change from a paint of one colour to a paint of another colour, pumping is stopped and the paint source is replaced with a source of flushing agent. When pumping recommences, the flushing agent is able to entirely flush out from the sub-chamber 7a traces of the paint previously used because of the vigorous swirling flow, which is enhanced by the acceleration of the liquid entering the chamber 7, and which impinges upon the entire inner surface 7c,4a of the sub-chamber 7a. The previously used colour of paint is relatively easily removable since pigment settlement has been mitigated against by the constant liquid motion. A new paint source can then be connected to the supply line. The diaphragm may advantageously be placed in a low position during flushing, whereby the lower sub-chamber volume provides a higher velocity flow without significantly restricting flow.

What I claim is:

1. A surge suppression apparatus comprising a chamber for receiving a liquid subject to pressure variation effects that are to be suppressed, an inlet having an opening through which said liquid is suppliable to the chamber, wherein said inlet is structured such that, in use, an inlet flow exiting the inlet opening into the chamber is directed along an inlet flow axis towards a wall of the chamber at an oblique angle to said wall; and an outlet located in alignment with a longitudinal axis of the chamber, wherein said inlet is radially displaced from the outlet relative to said axis and said inlet flow axis is non-orthogonal relative to an outlet flow axis intersecting the chamber at said outlet.

2. A surge suppression apparatus as claimed in claim 1, wherein at least a portion of the chamber wall towards which the inlet flow is directed is curved.

3. A surge suppression apparatus as claimed in claim 1, wherein the chamber wall is configured to promote movement of the liquid in the chamber in a swirl flow over substantially the entire area of the wall.

4. A surge suppression apparatus as claimed in claim 1, wherein the chamber is a sub-chamber defined by said chamber wall and a surface of a diaphragm.

5. A surge suppression apparatus as claimed in claim 4, wherein the chamber wall is configured to promote movement of the liquid in the chamber in a swirl flow over substantially the entire area of the chamber wall and the surface of the diaphragm.

6. A surge suppression apparatus as claimed in claim 1, wherein the chamber wall is in the form of a dish, the inlet being spaced from a central axis of the dish.

7. A surge suppression apparatus as claimed in claim 6, wherein the chamber further comprises outlet arranged concentrically with the axis of the dish.

8. The apparatus of claim 1, wherein said inlet opening is an oval opening formed in said wall.

9. The apparatus of claim 1, wherein an upstream portion of the inlet leading into the inlet opening is designed to direct said liquid along an inlet flow axis that is parallel to a plane perpendicular to the longitudinal axis of the chamber.

10. A surge suppression apparatus comprising a chamber for receiving a liquid subject to pressure variation effects that are to be suppressed, an inlet having an opening through which said liquid is suppliable to the chamber, wherein said inlet is structured such that, in use, an inlet flow exiting the inlet opening into the chamber is directed towards a wall of the chamber at an oblique angle to said wall; and an outlet located in alignment with a longitudinal axis of the chamber, wherein said inlet is radially displaced from the outlet relative to said axis, and wherein said inlet includes a funnel-shaped portion located upstream from the inlet opening to accelerate fluid flow through the opening into the chamber.

* * * * *